2,584,492

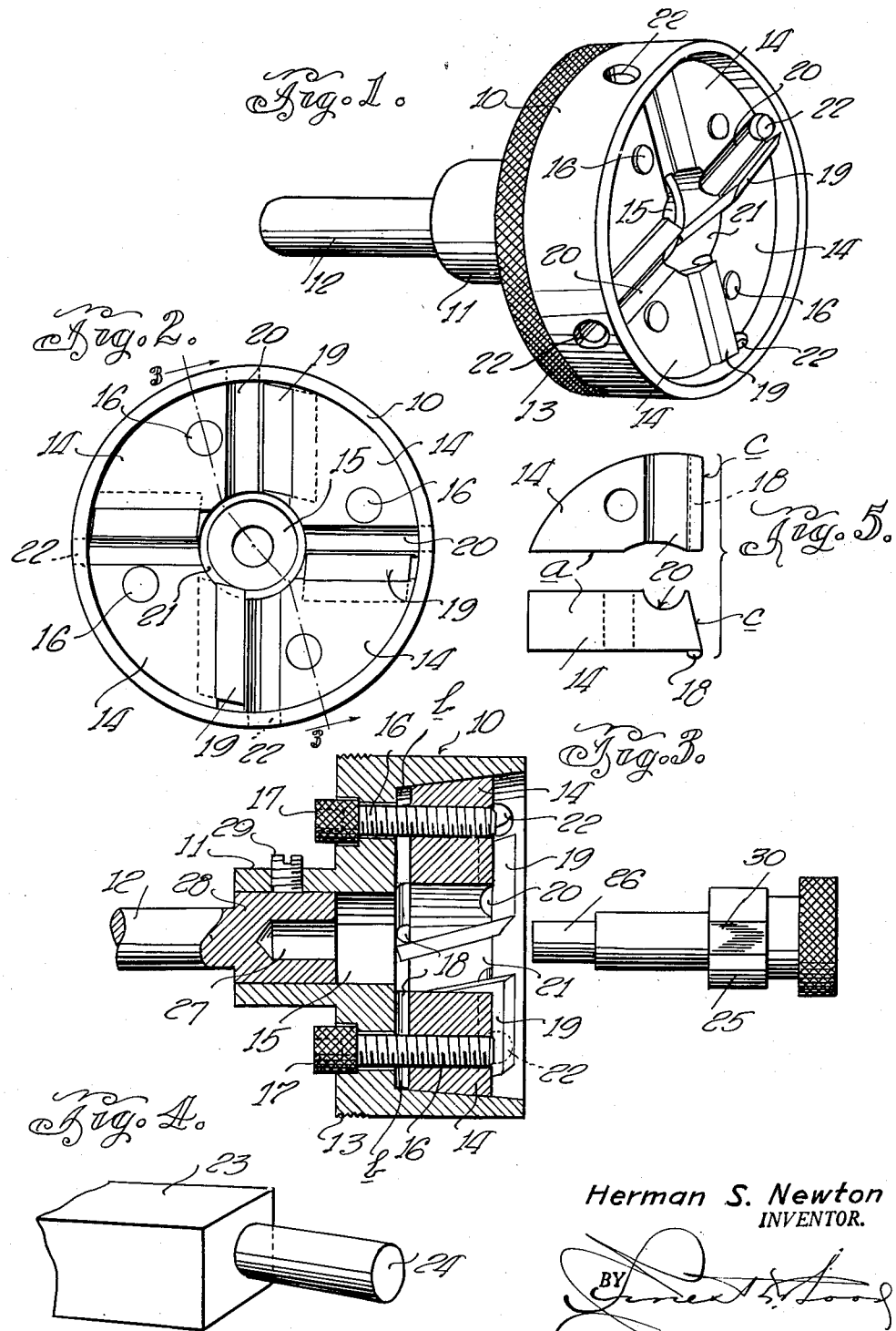
Feb. 5, 1952 — H. S. NEWTON — 2,584,492
DOWEL CUTTING HEAD
Filed April 17, 1947
Herman S. Newton
INVENTOR.
ATTORNEY Patented Feb. 5, 1952

UNITED STATES PATENT OFFICE 2,584,492

DOWEL CUTTING HEAD

Herman S. Newton, Temple, Tex.

Application April 17, 1947, Serial No. 742,147

5 Claims. (Cl. 142—32)

This invention relates to woodwork machines and equipment and more particularly to dowel cutting heads for wood boring machines.

The principal object of the invention is to provide a lathe attachment consisting of a circular body having inwardly convergent interior walls against which bear the correspondingly inclined surfaces of a plurality of radially disposed blade retaining segments, the blades being held at angles with respect to a central cavity in the body by bolts entering the latter at its rear and threadedly engaging said segments, drawing them inwardly into bonding engagement with the blades.

Another object of the invention is to provide a dowel cutting attachment for wood boring machines and related machinery in which each of the blade retaining segments is provided with a ridge along one edge at right angles to the longitudinal axis of the retaining bolt to serve as a fulcrum on which the segment is oscillated by the action of the bolt, causing the segment to exert a binding or clamping force on a blade. The fulcrum may be substituted for or employed in conjunction with the tapered or convergent walls of the body of the correspondingly inclined surfaces of the segments since both of these factors possess the common function of urging the segments into clamping engagement with the blades. The walls of the body can be convergent as set forth or relatively parallel.

Still another object of the invention is to provide radial dispensing troughs for cutting produced by the blades and apertures in the walls of the body in register with the outer ends of these troughs through which the cuttings are centrifugally projected.

Yet another object of the invention is to provide a medium for setting the blades in accurate cutting position, such position requiring that one of the series of radial blades be disposed slightly inwardly of the circular wall of the cavity into which the work extends as cutting proceeds, to determine the diameter of the dowel being cut.

With the foregoing and other objects in view, the invention has further reference to certain features of accomplishment which will become apparent as the description proceeds, taken in connection with the accompanying drawing wherein:

Figure 1 is a perspective view of a dowel cutting head constructed according to the present invention.

Figure 2 is a front elevational view thereof.

Figure 3 is a view in diametrical section, taken on line 3—3 on Figure 2.

Figure 4 is a perspective view of a sample of the work performed by the invention; and Figure 5 is a combined plan view and side elevational view of one of the blade retaining segments.

Continuing with a more detailed description of the drawing, reference numeral 10 denotes a circular body having a hollow boss 11 formed on its rear face to receive the end of a shank 12 by which the cutting head is mounted in the heat stock of a wood boring machine or related machinery. The head 10 has a circumferential knurled portion 13 as an aid to holding while being mounted or while the blades are assembled therein.

The inner wall surface of the body 10 is shown as being tapered towards the bottom, but can also be perpendicular to the bottom. A series of blade retaining segments 14 are disposed within the body and each has a tapered surface corresponding to that of the body and adapted to bear thereagainst. Obviously, movement of the segments 14 in a plane paralleling the rotative axis of the body will result in convergent displacement thereof towards a circular cavity 15 in the hub of the body 10. This displacement of the segments 14 is brought about by means of bolts 16 threaded into the segments through the rear face of the body 10, and provided with knurled heads 17.

Referring now specifically to the segments 14, it will be observed especially in Figure 5 that each segment has a ridge 18 on its under surface at right angles to the plane of the blade engaging surface $a$ of the segment. The ridge 18 provides a fulcrum which permits the bolt 16 to pull the segment downwardly and by virtue of the enlarged holes for the bolts 16 and the slight clearance $b$ between the segment 14 and the bottom surface of the body, the end of the segment opposite the fulcrum 18 is permitted to be drawn downwardly by a bolt 16 just enough to exert the necessary clamping force on a blade 19.

The blades 19 are each disposed at an angle to the rotative axis of the head between the segments 14 whose blade engaging surfaces $a$ and c are inclined for the purpose. Formed in the top of each segment 14 and parallel with the blade engaging surface c (Fig. 5), is a trough 20 which is adapted to clear the bit of the adjacent blade of chips and cuttings from the work which travels into the annular opening 21 defined by the grouped segments and blades and on into the circular cavity 15 of the body as the cutting operation is completed. Since the outer or discharge ends of the troughs 20 are well below the rim of the body 10, openings 22 are made in the rim in register with the troughs to permit escape of the cuttings centrifugally thrown by the high rotational speed of the head.

In Figure 4 is shown in perspective a fragmentary piece of work stock 23 which may be a chair rung. The dowel 24 thereon may be in axial alignment with the stock 23 or furniture design may require that it be disposed at an angle to the stock or rung. In any case, the diameter of the dowel is, of course, determined by the relative setting of the blades 19.

To insure accurate setting of the blades, a mandrel 25 (Fig. 3) is employed, of a known diameter, whose tail portion 26 enters snugly a cavity 27 in the end 28 of the shank 12 which is held in the hollow boss 11 by means of a set screw 29. Retention of the tail 26 of the mandrel 25 by the cavity 27 insures perpendicularity of the mandrel in relation to the bottom surface of the body, hence, when the blades 19 are moved manually towards the center, their inner ends come up against the mandrel 25 and one of the blades is permitted to move further inward because of the flattened surface 30 on the mandrel. This blade becomes the primary cutting blade and its inset position in relation to the others is shown clearly in Figure 2.

When convergent displacement of the segments 14 is effected by the bolts 16 to cause the blades to be firmly clamped in position, the mandrel 25 is withdrawn.

The stock 23, of any cross-sectional shape is secured by a suitable jig or work holder (not shown) either in axial alignment with the opening 21 defined by the segments 14 or at any desired angle with the result, after forcing the end of the work into the head, that a dowel 24 is formed at the exact angle desired or expected, to correspond with other measurements of a chair or other article to be fabricated.

It is to be understood that the clamping action of the segments 14 as brought about by the fulcrum 18 of each segment may be obtained in conjunction with or to the exclusion of the tapered walls of the head 10. On the other hand, the fulcrum 18 may be omitted in preference to the tapered walls of the head. In either case, the result is substantially the same, i. e., to effect inward displacement of the blade clamping segments.

It is further pointed out that to set the cutters 19, the segments 14 are first actuated to release the cutters, after which the latter are adjusted by hand, whereupon the segments are again tightened to clamp the cutters between them.

Manifestly, the construction as shown and described is capable of some modification and such modification as may be construed to fall within the scope and meaning of the appended claims is also considered to be within the spirit and intent of the invention.

What is claimed is:

1. A dowel cutting head including a circular, hollow body adapted for rotation and having tapered inner wall surfaces, a plurality of blade retaining segments having tapered surfaces in movable engagement with those of said walls, cutting blades interposed between said segments whose cutting edges are at right angles to the rotating axis of said body, bolts threadedly entering said segments through said body, each of said segments having a fulcrum on its underside at right angles to said bolts, on which said segment is moved into clamping relationship with an adjacent blade when tension is imposed on its respective bolt and a trough in each of said segments for releasing cuttings produced by said blades through the wall of said body.

2. A dowel cutting attachment for lathes, including a rotatable hollow body, a plurality of segments conformably grouped in said body and defining a central circular opening into which work is thrust for cutting, a bolt entering said body parallel to its rotating axis and threadedly engaging each of said segments, a plurality of blades held between said segments in a position inclined to the rotating axis of said body and whose inner ends are in abutting relation to the bottom of said body, a fulcrum on the bottom of each of said segments engaging the bottom of said body to effect convergence of said segments upon said blades to exert a clamping action thereon when said bolts are actuated, and a trough in each of said segments for discharging cuttings produced by said blades through openings in the wall of said body during rotation thereof.

3. A dowel cutting attachment for lathes including a hollow, rotary body having a circular cavity in its hub into which work travels during a cutting operation, a group of blade retaining segments in the hollow of said body whose confronting faces are inclined to the rotary axis of said body, a bolt entering through said body and threadedly engaging each of said segments, cutting blades between the inclined faces of said segments whose cutting edges are radial and substantially at right angles to the rotative axis of said body, and means on the bottom of each of said segments engageable with the bottom of said circular cavity to effect limited oscillative displacement of said segments with respect to the base of said cavity when said bolts are actuated to exert a clamping force on said blades.

4. In a dowel cutting attachment for lathes, a rotatable body having a circular cavity therein, a plurality of blade clamping segments grouped comfornably in said cavity, bolts threadedly entering said body parallel with its rotative axis and threadedly engaging said segments to effect movement of said segments in substantial parallelism with said rotative axis, cutting blades interposed between said segments whose cutting edges are collectively on a plane at right angles to said rotative axis, and means on the bottom of each segment engageable with the bottom of said cavity to effect oscillative displacement of said segments with respect to the base of said cavity when said bolts are actuated to impose a clamping force on said blades.

5. In a dowel cutting attachment for lathes, a rotatable body having an open forward end defining a cavity, a plurality of cutting blades disposed radially in said cavity and inclined in relation to the rotative axis of said body, the cutting edges of said blades being radial and at right angles to said rotative axis, a group of blade retaining segments within the hollow of said body, each having a trough in its upper face whose outer end is in register with an opening in the wall of said body through which cuttings from said blades are projected centrifugally during rotation of said body, a series of bolts threadedly entering the opposite end of said body, each engaging a segment and a fulcrum formed on the bottom of each segment and bearing on the bottom of said cavity for moving said segments into clamping engagement with said blades when said bolts are actuated.

HERMAN S. NEWTON.

REFERENCES CITED

The following references are of record in the file of this patent:

UNITED STATES PATENTS

| Number | Name | Date |
| --- | --- | --- |
| 164,718 | Coleman et al. | June 22, 1875 |
| 201,790 | Johnson | Mar. 26, 1878 |
| 639,772 | Rinker | Dec. 26, 1899 |
| 643,950 | Deope | Feb. 20, 1900 |
| 708,891 | Lassiter | Sept. 9, 1902 |
| 804,142 | Lassiter | Nov. 7, 1905 |
| 949,765 | Hawker | Feb. 22, 1910 |
| 1,010,894 | Godell | Dec. 5, 1911 |
| 1,646,758 | Matthews | Oct. 25, 1927 |